Patented May 29, 1951

2,555,058

UNITED STATES PATENT OFFICE 2,555,058

PLASTICS OBTAINED FROM AMYLACEOUS MATERIALS AND METHODS OF PREPARING SUCH PLASTICS

Lucien Rouzet, Clichy, France, assignor to "L'Impregnation," Clichy, France

No Drawing. Application September 5, 1946, Serial No. 695,044. In France January 24, 1940

Section 1, Public Law 690, August 8, 1946
Patent expires January 24, 1960

2 Claims. (Cl. 260—17.2)

This invention relates to the manufacture of synthetic resins and plastic materials on the basis of amylaceous materials. The term "amylaceous" is used herein to cover starches and dextrins.

It has already been suggested to treat amylaceous matter (soluble starch, white or yellow dextrin, flours and industrial starches of all kinds) with a certain quantity of formaldehyde or other aldehydes.

The resulting products, dried after treatment, become insoluble in water, even in boiling water, but do not possess the characteristics of synthetic resins properly so termed. Indeed, in spite of their insolubility in water, they retain a certain power of absorption for water which makes them useless for making molded members and they can only be used in practice for making washable dressings for the textile industry.

We have now found that if these products, derived from amylaceous material as a basis, are condensed either with urea or with a phenol or with urea and a phenol or any other products utilized for condensation, condensation products are obtainable which are soluble in water in any proportion and which behave as true synthetic resins, that is to say, they harden in heat and become completely insoluble in water and in organic solvents.

A working example, given merely by way of illustration, is as follows:

1 kg. of soluble starch is dissolved in two liters of 40% formol. This solution is neutralized and is heated to 100° C., maintaining it at this temperature for two hours. The solution has then become clear and very fluid. To this solution are added:

200 grams of urea
75 grams of phenol
20 grams of carbonate of soda

The temperature is maintained at 100° for another 15 minutes and then cooling takes place. A coloured liquid is thus obtained, which is soluble in water and in mineral and vegetable oils, but which precipitates in alcohol.

The liquid product thus obtained can be dried in a vacuum and is then obtained as a translucent, hard material, difficult to crush and having the appearance of a true resin. This new synthetic resin has the same properties as the known synthetic resins and has moreover the advantage of low cost. It can be made plastic with known plastifying agents.

On the other hand, if the said liquid is absorbed by dried cellulose paste and reduced to powder, an inexpensive plastic material is obtained which can be used in the same way as all the usual molding materials.

The invention is not of course limited to the procedure indicated above, which has merely been selected as an example.

I claim:

1. A method of producing a synthetic resin, comprising: obtaining an intermediate product by dissolving 1 kilogram of soluble starch in 2 liters of 40 per cent. formol, neutralizing the solution, heating the neutralized solution to 100 degrees centigrade and maintaining it at this temperature for 2 hours, adding thereto 200 grams of urea, 75 grams of phenol and 20 grams of sodium carbonate, maintaining the temperature for another 15 minutes, cooling the solution, and drying the solution.

2. A plastic comprising the product resulting from the method of claim 1.

LUCIEN ROUZET.

REFERENCES CITED

The following references are of record in the file of this patent:

UNITED STATES PATENTS

| Number | Name | Date |
|---|---|---|
| 2,121,076 | Ellis | June 21, 1938 |
| 2,212,314 | Bauer | Aug. 20, 1940 |
| 2,246,635 | Moller | June 24, 1941 |

FOREIGN PATENTS

| Number | Country | Date |
|---|---|---|
| 865,407 | France | Feb. 24, 1941 |